April 28, 1970 — D. E. HILL — 3,508,316
APPARATUS FOR MANUFACTURING WOUND STATORS
Filed May 19, 1966 — 4 Sheets-Sheet 1
FIG.I.
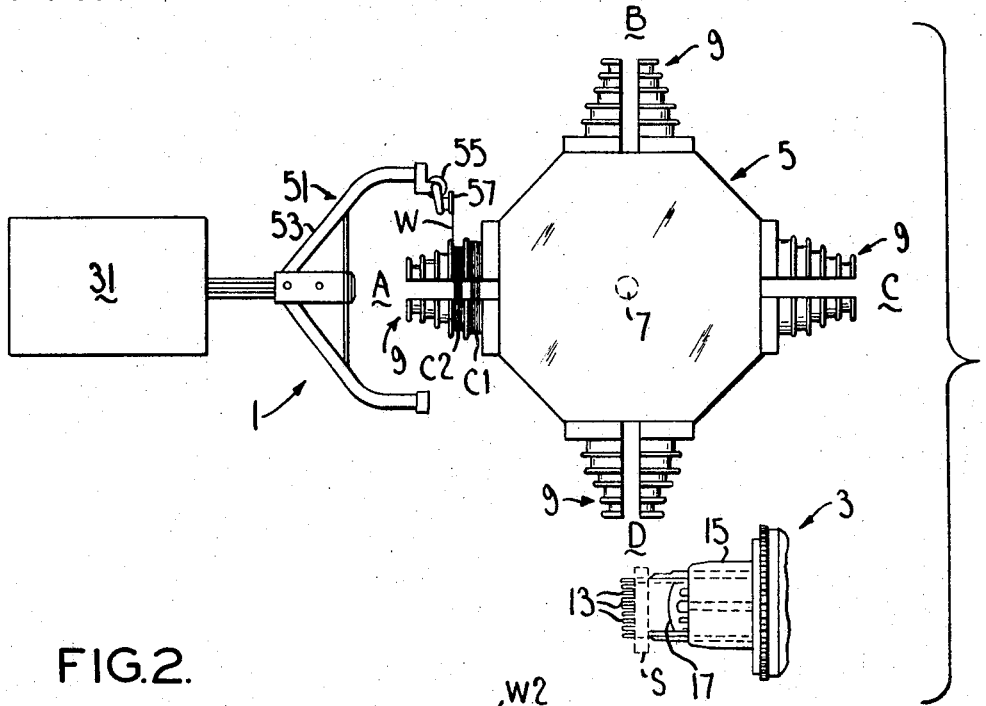
FIG.2.
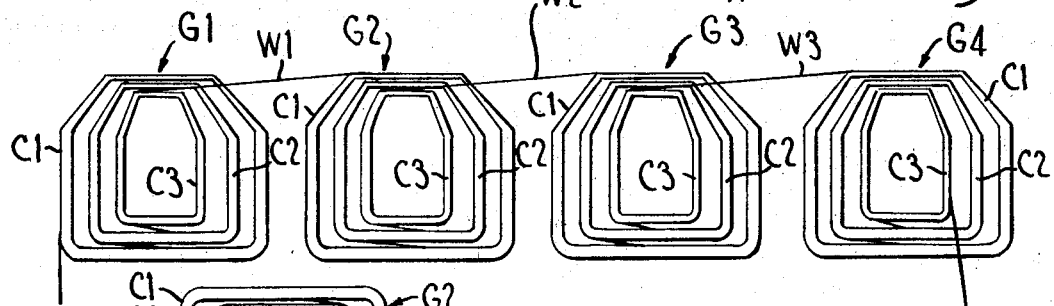
FIG.3.
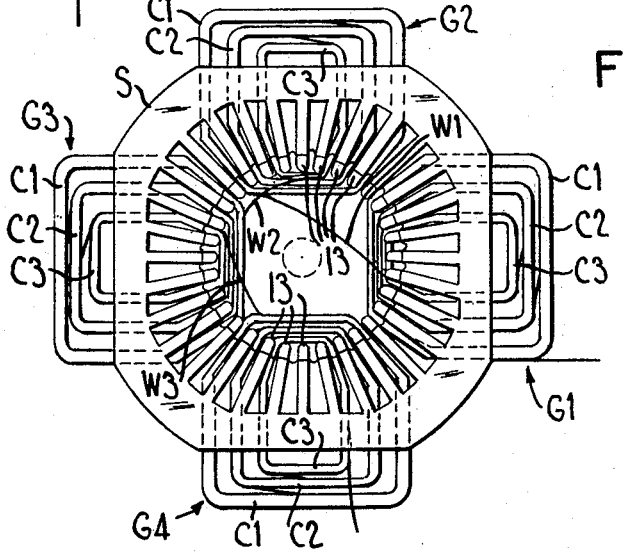
Donald E. Hill,
Inventor.
Koenig, Senniger,
Powers and Leavitt,
Attorneys.

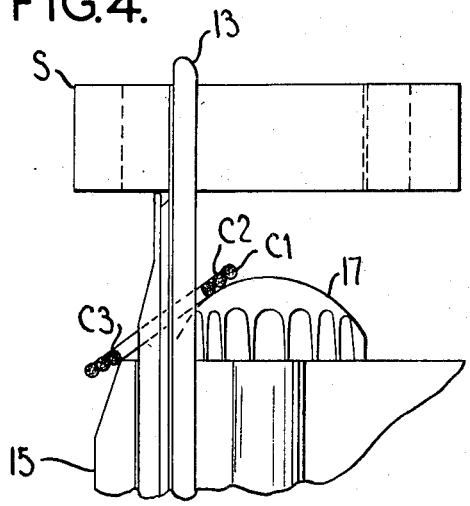
FIG. 4.
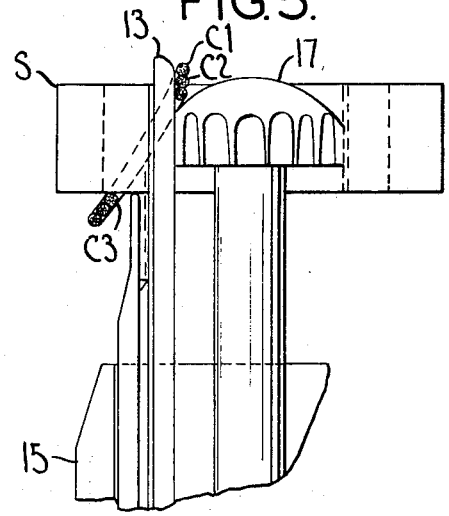
FIG. 5.
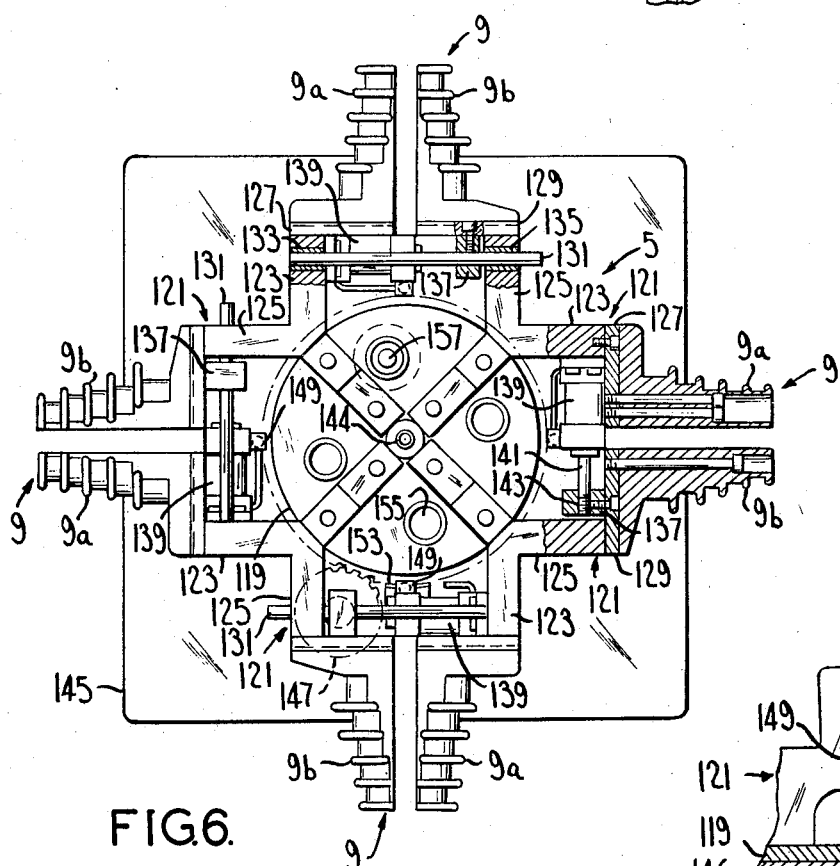
FIG. 6.
FIG. 7.

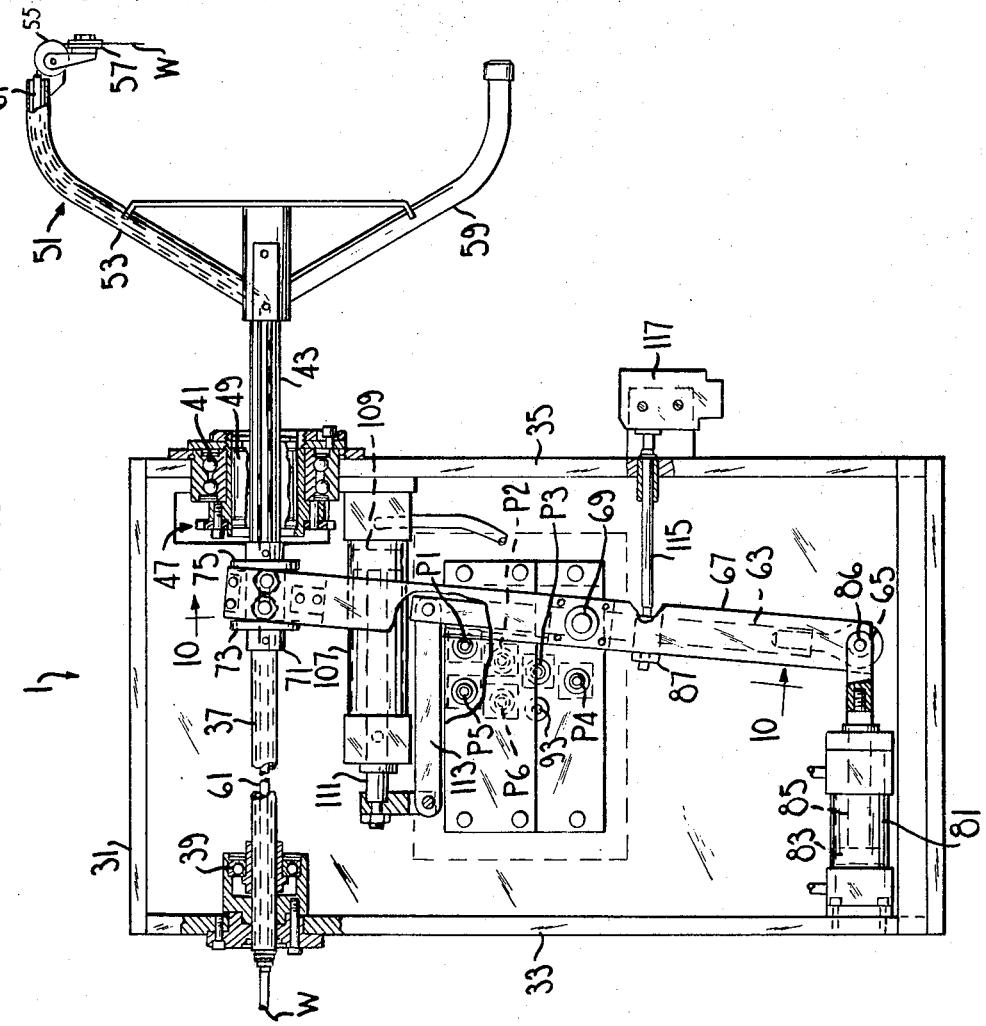

United States Patent Office 3,508,316
Patented Apr. 28, 1970

3,508,316
APPARATUS FOR MANUFACTURING
WOUND STATORS
Donald E. Hill, 5105 Woodhurst Drive,
Fort Wayne, Ind. 46807
Filed May 19, 1966, Ser. No. 551,328
Int. Cl. H02k 15/00; H01j 7/06
U.S. Cl. 29—205                                5 Claims

ABSTRACT OF THE DISCLOSURE

Apparatus for winding coils to be placed in the slots of a stator of an electric motor or the like, comprising a rotary indexing turret having four coil forms spaced at intervals therearound adapted for rotation to bring each coil form to a winding station and thence to an unloading station, and means adjacent the unloading station for placing the coils in the slots of a stator. Each coil form has steps for winding a group of coils of different sizes thereon, winding being effected by a flyer which is shifted for winding coils on the different steps, and which may be traversed for level winding the wire. The wire is wound without severing it between successive coils of each group, and without severing it between successive groups, and a group of coils unloaded from the coil form at the unloading station is placed in the slots of a stator while another group is being wound at the winding station.

---

This invention relates to apparatus for manufacturing wound stators, e.g., stators for electric motors, the apparatus comprising a coil winder for prewinding of coils to be placed in the slots of a stator.

Among the several objects of the invention may be noted the provision of improved apparatus for manufacturing wound stators utilizing prewound coils which eliminates any necessity for making connections between the coils placed in the slots of the stator; the provision of apparatus comprising an improved coil winder for prewinding coils to be placed in the slots of a stator in such manner that all the coils which are to be placed in the slots of a stator may be prewound from a wire without cutting the wire between coils, so as to eliminate any necessity for making connections between the coils placed in the slots of the stator; the provision of apparatus with a coil winder such as described having improved means for winding of coils on stepped coil forms to provide coils of different sizes; and the provision of apparatus which a coil winder such as described having means for level winding the wire on each step of the coil forms. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan of an apparatus of this invention;

FIG. 2 is a view showing four interconnected groups of coils such as may be wound by the FIG. 1 apparatus;

FIG. 3 is a view showing the four groups of coils of FIG. 2 and a stator as placed on the coil placing unit of the FIG. 1 apparatus for placement of the coils in the slots of the stator;

FIGS. 4 and 5 are views illustrating the placement of a coil in slots of a stator;

FIG. 6 is an enlarged plan of a coil form turret shown in FIG. 1, with a cover of the turret removed, partly broken away and shown in section;

FIG. 7 is a view showing a detail of the turret;

FIG. 8 is an end elevation of a coil winder shown in FIG. 1, partly broken away and shown in section;

FIG. 9 is a longitudinal section taken on line 9—9 of FIG. 8, with parts further broken away and shown in section;

Corresponding reference characters indicate corresponding parts throughout the several views of the drawings.

Figure 10:
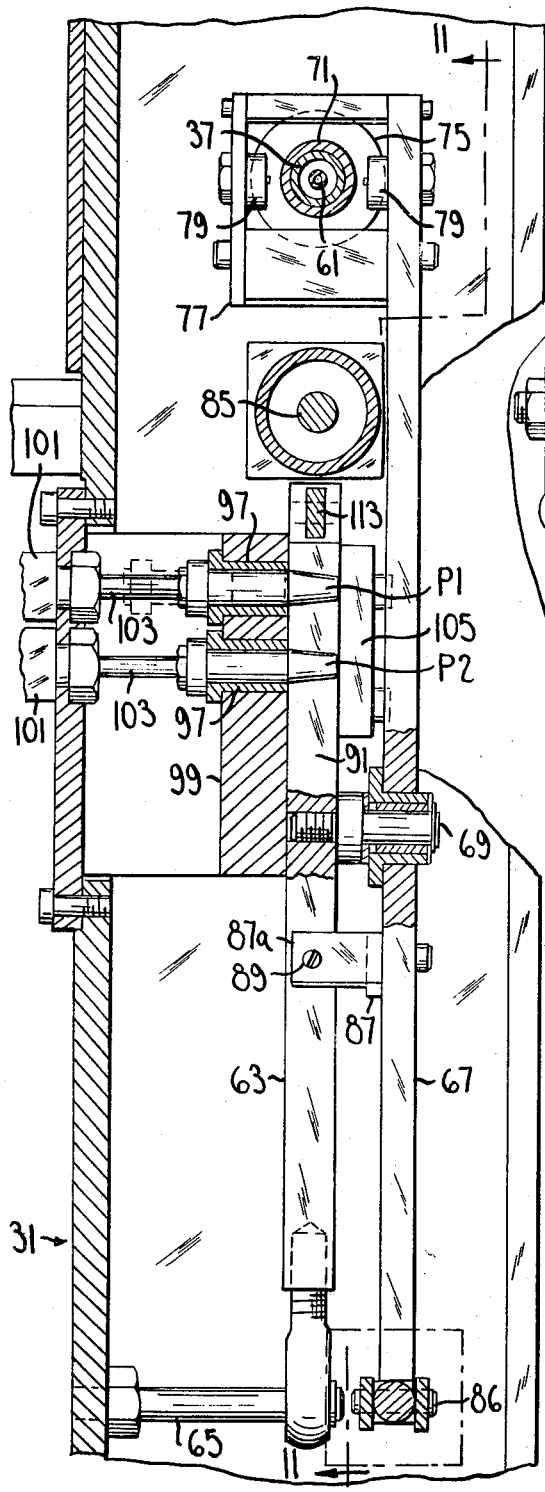
FIG. 10 is an enlarged section taken on line 10—10 of FIG. 9.

Referring first to FIG. 1 of the drawings, an apparatus utilized in accordance with this invention is shown to comprise a coil winder generally designated 1, by means of which coils to be placed in the slots of a stator are prewound, and a coil placing unit 3 by means of which the coils prewound by the winder are placed in the slots of a stator S of an electric motor or the like. The coil winder 1 comprises a rotary indexing turret 5, rotatable on a central axis at 7, carrying a plurality of coil forms each designated 9 extending radially outward from the turret at equally spaced intervals around the turret. As shown, the turret carries four coil forms 9, spaced at 90° intervals therearound. Each coil form is a stepped coil form, having a series of steps for winding thereon of a group of coils of different sizes the group constituting a poll winding. The turret is indexable in 90° steps about its axis at 7 successively to position each coil form at a winding station A, a first intermediate station B, a second intermediate station C, and a coil unloading position or station D. The coil placing unit is located closely adjacent the unloading position or station D whereby coils which have been prewound on each coil form at station A and then indexed around to station D may be removed from the form at station D and transferred to the coil placing unit 3, the latter then being actuated to place the coils in the slots of a stator.

The coil placing unit per se is of a type such as shown in the copending U.S. patent application of Donald E. Hill, Ser. No. 452,732, filed May 3, 1965, entitled Coil Placing Apparatus, issued as U.S. Patent 3,324,536 June 13, 1967. Generally, it comprises a plurality of fingers 13 spaced around in a circle adapted for placement thereon of a stator S of an electric motor or the like. As will be understood, such stators conventionally have a circular bore and axial slots located in radial planes extending out from the bore for receiving the side portions of coils which constitute the winding of the stator. The fingers extend from a head assembly 15 which is rotatable to different positions to facilitate locating coils on the fingers preparatory to their being placed in a st ator. A stripper 17, which is fluted around its periphery for interfitting with the fingers, is slidable within the fingers for driving coils through the bore of the stator and forcing them radially outward into the stator slots.

Generally, a first group of coils (a first pole winding) is wound on the coil form at station A. This group may comprise three integrally interconnected coils, for example, as shown in FIG. 2, wherein this first group is designated G1 and the three coils in the group are designated C1, C2 and C3. The coils are of different sizes and are wound without severing the wire between coils, leaving the wire intact between the successive coils. Then the turret is indexed to carry the coil form bearing this group G1 of coils to station B, and to bring an unloaded coil form from station D to station A. A second group G2 of three interconnected coils C1, C2 C3 (constituting a second pole winding) is wound on the coil form at station A, without severing the wire between group G1 and group G2, leaving the wire intact between these groups.

The uncut intact wire extending between groups G1 and G2 is indicated at W1 in FIG. 2. Then the turret is indexed to carry group G1 around to station C, to carry group G2 around to station B, and to bring an unloaded coil form from station D to station A. A third group G3 of three interconnected coils C1, C2, C3 (constituting a third pole winding) is wound on the coil form at station A, without severing the wire between group G2 and group G3, leaving the wire intact between these groups. The uncut intact wire extending between groups G2 and G3 is indicated at W2 in FIG. 2. Then the turret is indexed to bring group G1 around to station D, group G2 around to station C, group G3 around to station B, and to bring an unloaded coil form around to station A. A fourth group of three interconnected coils C1, C2, C3 (constituting a fourth pole winding) is wound on the coil form at station A, without severing the wire between groups G3 and G4, leaving the wire intact between these groups. The uncut intact wire extending between groups G3 and G4 is indicated at W3 in FIG. 2.

Group G1 of coils C1, C2, C3, having been indexed around to station D, is taken off (unloaded from) the coil form at station D and placed on the fingers 13 of the coil placing unit 3. The turret 5 is then indexed 90° to carry the unloaded coil form from station D to station A, and to bring the coil form bearing group G2 around to station D, group G3 advancing to station C, and group G4 advancing to station B. The head assembly 15 of the coil placing unit is then indexed 90°, and the second group G2 of coils is taken off the coil form at station D and placed on the fingers of the coil placing unit. At the same time, winding of a group G1 for the next stator is carried out at station A without severing the wire between group G4 and new group G1. The turret is then indexed 90° to carry the unloaded coil form from station D to station A, and to advance group G3 to station D, group G4 to station C, and the next group G1 to station B. The head assembly 15 of the coil placing unit is then indexed 90°, and the third group G3 of coils is taken off the coil form at station D and placed on the fingers of the coil placing unit. At the same time, winding of a group G2 for the next stator is carried out at station A. The turret is then indexed 90° to carry the unloaded coil form from station D to station A, and to advance group G4 to station D, group G1 to station C etc. The head assembly 15 is then indexed 90°, and the fourth group G4 of coils is taken off the coil form at station D and placed on the fingers of the coil placing unit. At the same time, winding of a group G4 for the next stator is carried out at station A. With the set of four groups or pole windings G1–G4 in place on the fingers 13, the wire connecting group G4 and new group G1 is severed and a stator S is placed on the fingers, and stripper 17 is driven through the stator to place the coils in the stator slots. FIGS. 3 and 4 illustrate how the coils and the stator are placed on the fingers, and FIG. 5 illustrates how the stripper is driven through the stator to drive the coils through the stator bore and force them radially outward into the stator slots. The stator with the coils placed therein is then removed from the fingers, and the operation is repeated to place the next four groups of coils in the slots of the next stator.

Referring now more particularly to FIGS. 8–11, the coil winder 1 is shown to comprise a housing 31 having end walls 33 and 35 which lie in vertical planes at right angles to the radial plane of the coil form 9 at the winding station A. A tubular shaft 37 is journalled for rotation and axial sliding movement in bearings 39 and 41 in walls 33 and 35 in line with horizontal axis of the coil form 9 at station A. The shaft is splined as indicated at 43 and is adapted to be driven by an electric motor 45 via a chain and sprocket drive 47, this drive including an internally splined sleeve 49 for driving the shaft while permitting axial sliding movement thereof. Secured on the end of the shaft toward the winding station A is a flyer 51 comprising an inclined tubular arm 53 at the end of which are wire guide rollers 55 and 57, and an inclined counterbalance arm 59. Extending centrally through the shaft is a wire feed tube 61 which reaches out of the shaft through the tubular flyer arm 53. Wire W is adapted to be fed through this tube, which may be a nylon tube, from a supply coil (not shown), passing out of the end of the tube at the end of flyer arm 53 and thence around guide roller 55 and radially inward between guide rollers 57 to the coil form at winding station A.

Means is provided for axially shifting the shaft 37 and hence the flyer 51 for progressing ("jumping") from the winding of a coil on the first step (the highest step) of the coil form at winding station A to the winding of a coil on the second step of the coil form, for progressing ("jumping") from the winding of a coil on the second step to the winding of a coil on the third step, and so on to successive steps of the coil form, and also for reciprocating the shaft back and forth to reciprocate the wire feeding onto each step from the flyer for winding level layers of wire on each step. This means is shown to comprise a shift member constituted by a lever 63, which may also be referred to as the shift or "jump" lever, pivoted for swinging movement in the vertical plane of the shaft on a horizontal pivot 65 extending transversely with respect to the shaft adjacent the bottom of the housing 31. A lever 67, which is referred to as the level wind lever, is pivoted intermediate its ends as indicated at 69 on the shift lever on a horizontal axis parallel to the axis of pivot 65. Secured to the shaft 37 and rotatable therewith is a sleeve 71 having two spaced flanges 73 and 75. Shift lever 67 carries a yoke 77 at its upper end surrounding the sleeve 71 between these flanges, and this yoke carries rollers 79 engageable with the flanges 73 and 75 for axially moving the shaft on movement of lever 67 while permitting the shaft to rotate. An air cylinder 81 extends inward from end wall 33 of the housing, having a piston 83 working therein. A piston rod 85 extends from the piston and has its outer end pivotally connected to the lower end of lever 67 as indicated at 86. The piston 83 is reciprocable in cylinder 81, suitable conventional valve means (not shown) being provided for controlling supply of compressed air to and venting of air from opposite ends of the cylinder via ports at the ends of the cylinder for oscillating the lever 67 on its pivot on lever 63. A bracket 87 secured to level wind lever 67 below its pivot 69 has an arm 87a extending in front of lever 63 and a set screw 89 is adjustably threaded in arm 87a for engagement by lever 63. This adjustably limits the oscillation of lever 67. The parts are arranged so that, when piston 83 is in its fully retracted position, pivot 86 coincides substantially with pivot 65 (see FIG. 9).

Figure 11:
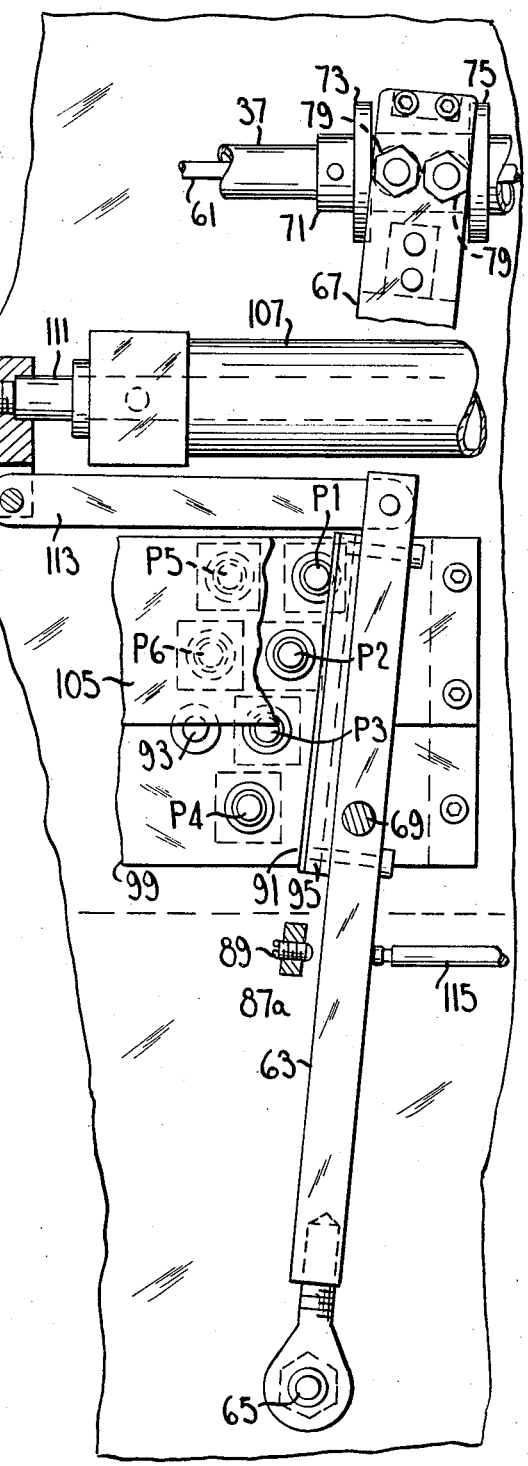
FIG. 11 is a vertical section taken on line 11—11 of FIG. 10.

Lever 63 is illustrated in FIGS. 9 and 11 at the right-hand limit of its throw for the winding of a coil (coil C1) on the highest step of a coil form at station A. It is adapted to be swung to the left from this position in steps corresponding to the spacing of the steps on a coil form to a series of positions determined by engagement of a bumper plate 91 on the lever with one of a series of a so-called retractable stops generally designated by the letter P, or a fixed stop 93 which determines a left-hand limit for the lever 63. Bumper plate 91 is backed by a shock-absorbing rubber pad 95. As shown herein, there are six stops P, each constituted by an axially slidable pin, designated P1–P6 in order. Each of these stop pins P1–P6 (which may also be referred to as jump pins) is movable from an operative position confronting the bumper plate 91 to a retracted position clear of the bumper plate. As shown best in FIG. 10, the pins are slidable in openings 97 in a plate 99 mounted adjacent the path of lever 63. For each pin there is an air cylinder 101 having a piston working therein and a piston rod 103 extending from the piston, the pin being secured on the end of the piston rod. Each pin is movable by the respective air cylinder between an advanced position wherein the end of the pin projects from plate 99 and confronts bumper plate 91, as shown for the pins P1 and P2 in FIG. 10, and a retracted position wherein the end of the pin is withdrawn into its hole in plate 99 clear of the bumper plate, as shown in dotted lines for the pin P1 in FIG. 10. A plate 105 is provided on the opposite side of lever 63 from plate 99.

The pins P1–P4 are located on a line inclined away from vertical in the direction away from station A, pin P1 being the uppermost of these four pins, pin P2 being spaced back from pin P1, pin P3 being spaced back from pin P2, and pin P4 being spaced back from pin P3. Pin P5 is located at the same level as pin P1, and spaced back of pin P4. Pin P6 is located at the level of pin P2 and spaced back of pin P5. Stop 93 (which is a fixed stop) is located at the level of pin P3 and spaced back of pin P6. With the six pins P1–P6 and the stop 93, lever 63 can be located in a maximum of seven different positions, for winding up to seven coils on coil forms having up to seven steps. These seven positions are determined by engagement of bumper plate 91 with pins P1–P6 and stop 93, respectively. The lever 63 is movable from the first of these positions (its position determined by engagement of bumper plate with pin P1) to each or any of the second to the seventh positions and movable back to its first position by means of an air cylinder 107 having a piston 109 slidable therein, a piston rod 111 extending from the piston out through the left end of the cylinder, and a link 113 connecting the outer end of the piston rod to the upper end of the lever 63.

In further explanation of the above, let it be assumed, for example, that lever 63 is in the first position shown in FIGS. 9 and 11 for winding on the first step (the highest step) of a coil form 9. This position is determined by engagement of the bumper plate 91 on arm 63 with the first jump pin P1, which, along with all the other pins, is in its extended position, compressed air being supplied to the right end of cylinder 107 and air being vented from the left end of cylinder 107 under control of suitable conventional valve means (not shown) so that lever 63 is biased against pin P1. With lever 63 in this first position, winding of the wire by means of flyer 51 on the first step of the coil form proceeds. If it is desired to level wind the wire on this first step of the coil form, lever 67 is oscillated by means of cylinder 81 to traverse the shaft 37 and flyer 51 back and forth through a stroke which is adjustable via set screw 89. When the desired number of turns of the wire have been wound on the first step, as may be determined by a suitable conventional counter for counting the number of revolutions of shaft 37, the cylinder 101 for pin P1 is actuated to retract pin P1. Lever 63 thereupon jumps to its second position determined by engagement of bumper plate 91 with the second pin P2 under the backing-off bias of air cylinder 107. This shifts the shaft 37 and flyer 51 to a second position for winding on the second step of the coil form. When the desired number of turns of wire have been wound on the second step, cylinder 101 for pin P2 is actuated to retract pin P2. Lever 63 thereupon jumps to its third position determined by engagement of bumper plate 91 with the third pin P3 under the bias of air cylinder 107 and shifts the flyer to the position for winding on the third step of the coil form. In any position of lever 63, lever 67 may be oscillated by means of cylinder 81 to traverse the shaft 37 and flyer 51 back and forth for lever winding on the respetcive step of the coil form. Assuming three coils only are to be wound, e.g., coils C1, C2, C3 as in FIG. 2, after the completion of winding of the third coil the air connections to cylinder 107 are reversed, and piston rod 111 is pulled back into the cylinder to swing lever 63 (and lever 67 along with it) back into engagement with a shift rod 115 for actuating a switch 117. Switch 117 controls the valve for cylinder 107 and each of the separate valves for cylinders 110, causing each of the pins P1–P6 which have been previously withdrawn to revert to their interference position with lever 63 and to change the air connections to cylinder 107 back to their status for biasing lever 63 against pin P1.

Referring to FIG. 6, the turret 5 is shown to comprise a rotary circular plate 119 having four Y-shaped brackets each generally designated 121 mounted thereon, the stems of the brackets being secured to the plate on radii of the plate spaced at 90° intervals, and the branches of the brackets forming four pairs of arms spaced at 90° intervals around the plate. One arm of each pair is designated 123 and the other 125. Each pair of arms carries a coil form 9. This is a split collapsible coil form, comprising two sections 9a and 9b. Section 9a is a fixed section, removably secured to a mounting plate 127 fastened to arm 123. Section 9b is a movable section, removably secured to a slide plate 129 mounted for sliding movement toward and away from plate 127. This slidable mounting of plate 129 and coil form section 9b thereon comprises a rod 131 slidable in openings 133 and 135 in arms 123 and 125, and a block 137 on plate 129 fastened to the rod. Plate 129 is adapted to be moved toward and away from plate 127 by means of an air cylinder 139 mounted on the inside of arms 123, having a piston rod 141 extending from a piston therein to a connection at 143 with plate 129. Cylinder 139 is adapted for actuation to move coil form section 9b from an expanded position, such as shown for all the coil forms in FIG. 6, toward section 9a to collapse the coil form for removal of coils wound thereon, and then to return section 9b to expanded position for winding the next group of coils thereon. The coil form sections 9a and 9b are removably secured to plates 127 and 129 for interchange of coil forms.

The turret plate 119 is mounted on a shaft 144, journalled in a table 145, which may be tubular and serve as a compressed air supply for the air cylinders 139. Mechanism for rotating the plate for indexing the turret is shown to comprise a gear 146 associated with the plate 119 and a pinion 147 in mesh with the gear. Pinion 147 is rotated in suitable manner for indexing the turret in 90° steps. Each air cylinder 139 is shown as having a valve 149 associated therewith for controlling the operation of the cylinder, each valve having an operating button 151 (see FIG. 7), engageable by a fixed actuator 153 on table 145 when the valve is brought around to station D for actuating the valve to effect collapse of the coil form at station D. Turret plate 119 is shown as having four holes such as indicated at 155 therein spaced at 90° intervals, and a detent may be provided as indicated at 157 for entry into each hole as it comes around to the position of the detent for releasably latching the turret in its indexed positions.

In the operation of the apparatus as above described, assuming that four groups G1–G4 each comprising three coils C1, C2, C3 (FIG. 2) are to be wound and placed in a stator S, the apparatus starts out with lever 63 in the first position in which it is shown in FIGS. 9 and 11 against pin P1, meaning that flyer 51 is in position for winding coil C1 on a first step of the expanded coil form 9 at station A. Wire W from the wire supply, threaded through tube 61 and emerging from the end of tube 61 at the end of flyer arm 53, is secured to the first step of the coil form, and motor 45 is energized to drive the shaft 37 to rotate the flyer, thereby to effect winding of the wire into coil C1 on the first step of the coil form. This proceeds until the requisite number of turns of wire for coil C1 have been wound. Level wind lever 67 may be oscillated on its pivot 69 on lever 63 by means of air cylinder 81 during the winding of coil C1 to effect reciprocation of shaft 37 on its axis and consequently to effect reciprocation of flyer 51 longitudinally of the coil form to level wind the wire on the coil form step.

When the requisite number of turns of wire for coil C1 have been wound on the first step of the coil form 9 at station A, pin P1 is retracted from in front of bumper plate 91 on lever 63, and the latter is swung in counterclockwise direction under the bias of air cylinder 107 to a second position against pin P2. This shifts the shaft 37 and flyer 51 to the left as viewed in FIGS. 1 and 9 to a second position (such as shown in FIG. 1) for winding coil C2 on a second step of the coil form at station A. This "jump" of the flyer is effected without severing the wire, and the flyer immediately proceeds to wind coil C2 on the second step of the coil form. Level wind lever 67 may be oscillated to effect level winding of the wire on the second step.

When the requisite number of turns of wire for coil C2 have been wound on the second step of the coil form 9 at station A, pin P2 is retracted, and lever 63 swings counterclockwise under the bias of air cylinder 107 to a third position against pin P3. This shifts the shaft 37 and flyer 51 farther to the left as viewed in FIGS. 1 and 9 to a third position for winding coil C3 on a third step of the coil form at station A. Again, this "jump" of the flyer is effected without severance of the wire, and the flyer immediately proceeds to wind coil C3 on the third step of the coil form. Level wind lever 67 may be oscillated to effect level winding of the wire on the third step.

When the requisite number of turns of wire for coil C3 have been wound on the third step of the coil form 9 at station A, motor 45 is deenergized to stop the flyer 51. The latter is then rotated to a position for clearing the coil form bearing the coils C1, C2, C3 wound as described above for movement from station A to B (generally, this involves turning flyer 51 through 90° from its FIG. 1 position to its FIG. 9 position). The turret 5 is then indexed 90° clockwise as viewed in FIG. 1 to bring the coil form 9 bearing coils C1, C2, C3 of group G1 around to station B and to bring the coil form 9 which was at station D to station A. This is effected without severance of the wire W between the outer end of flyer arm 53 and the last coil C3 of group G1. The jump lever 63 is returned from its position engaging pin P3 back to its first position, thereby shifting flyer 51 back to its first position, and pins P1 and P2 are returned to their advanced position for the winding of the next group G2 of coils.

The motor 45 is then started again to drive the shaft 37 and the flyer 51, and coils C1, C2, C3 of group G2 are wound on the coil form 9 now at station A in the same manner as above described in connection with the winding of the first group G1. After the second group G2 has been wound, the motor is stopped, and the turret is indexed 90° to bring the coil form bearing group G1 from station B to station C, the coil form bearing group G2 from station A to station B, and a fresh coil form from station D to station A. This is effected without severance of the wire W between the outer end of the flyer arm 53 and the last coil C3 of group G2. The flyer 51 is returned to its first position, and pins P1 and P2 are returned to their advanced position for the winding of the next group G3 of coils.

The motor 45 is then restarted to drive the shaft 37 and the flyer 51, and coils C1, C2, C3 of group G3 are wound on the coil form 9 now at station A in the same manner as above described in connection with the winding of the first group G1. After the third group G3 has been wound, the motor is stopped, and the turret is indexed 90° to bring the coil form bearing group G1 to station D, the coil form bearing group G2 to station C, the coil form bearing group G3 to station B, and a fresh coil form to station A. This is effected without severance of the wire W between the outer end of the flyer arm 53 and the last coil C3 of group G3. The flyer 51 is returned to its first position, and pins P1 and P2 are returned to their advanced position for the winding of the next group G4 of coils.

The motor 45 is then started again to drive the shaft 37 and the flyer 51, and coils C1, C2, C3 of group G4 are wound on the coil form now at station A in the same manner as above described in connection with the winding of the first group G1. While this winding of group G4 is taking place, group G1, which is at unloading station D, is taken off the coil form 9 at station D (this coil form having been collapsed to enable removal of the coils thereon), and placed on the fingers 13 of the coil placing unit 3 in a position relative to the fingers as appears in FIG. 3.

After the fourth group G4 has been wound on the coil form at station A, the motor 45 is stopped. The turret is indexed 90°, bringing the coil form bearing group G2 to station D, the coil form bearing group G3 to station C, the coil form bearing group G4 to station B, and the previously unloaded coil form from station D to station A. Winding of another group G1 for the next stator proceeds retaining the uncut wire between group G4 and new group G1. While this is taking place, group G2 is taken off the coil form at station D and placed on fingers 13 of the coil placing unit 90° around from group G1 (see FIG. 3).

After the new group G1 has been wound, the turret is indexed 90°, bringing group G3 to station D, group G4 to station C, new group G1 to station B, and the previously unloaded coil form to station A. Winding of another group G2 for the next stator proceeds at station A. While this is taking place, group G3 is taken off the coil form at station D and placed on fingers 13 of the coil placing unit 90° around from group G2 (see FIG. 3).

After the new group G2 has been wound, the turret is indexed 90°, bringing group G4 to station D, new group G1 to station C, new group G2 to station B, and the previously unloaded coil form to station A. Winding of another group G3 for the next stator proceeds at station A. While this is taking place, group G4 is taken off the coil form at station D and placed on fingers 13 of the coil placing unit 90° around from group G3 (see FIG. 3). The wire is then severed between group G4 and new group G1 which is now at station C. This completes the placement of four groups G1–G4 of coils on the fingers. A stator S is then placed on the fingers over the coils (see FIG. 3), and stripper 17 is driven through the stator to lodge the coils in the stator slots. The stator, with the coils in its slots, is then taken off the fingers 13.

Following the above, and after the new group G3 has been wound, the turret is indexed 90°, bringing new group G1 to station D, new group G2 to station C, new group G3 to station B, and the previously unloaded coil form to station A. Winding of another group G4 for the next stator proceeds at station A. While this is taking place, group G1, at station D, is taken off the coil form at station D and put on the fingers to start the placement of four groups of coils in the next stator, and this is carried out for stator after stator in repetitive manner proceeding as above described.

While, as above described, three coils are wound on each coil form it will be understood that with six jump pins P1–P6 and stop 93, up to seven coils may be wound on each coil form. The number of jump pins may be varied. It will also be understood that lever 63 may be jumped, for example, from pin P1 to P3 (be retracting pins P1 and P2), or in other selected manner for winding on various coil forms which may be used on the turret. Also plate 91 may be replaced by a plate having a surface stepped so as to vary the length of jump in a sequential stepped manner instead of having all jumps the same in length. It is contemplated that more than one winder may be used in conjunction with the turret 5; for example, it is possible to provide a winder 1 for winding on the coil form at what is represented as station A and another winder for winding on the coil form at the opposite station C. In such case, coils wound at station A may be unloaded at station B and placed in a stator by means of a coil placing unit at station B, and coils wound at station C may be unloaded at station D and placed in a stator by means of a coil placing unit at station D. Also it is possible that one set of coils may be wound at station A, indexed to station B, in the previously described manner and a second set of coils wound on top of the previously wound coils, thereby providing two sets of coils on the same coil form, which may be of different wire, wire size and number of turns for unloading from station D.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed:

1. Apparatus for providing a winding for a stator of the type having a bore and slots extending outward from the bore comprising means for winding a wire into a plurality of groups of coils for placement in the slots of the stator leaving the wire intact between successive coils of each group and between successive groups for integral interconnection of the coils in each group and for integral interconnection of the sucsessive groups, and means adjacent the winder for receiving the interconnected groups of coils from the winding means and placing them in the slots of a stator, said winding means comprising an indexing turret, a plurality of coil forms spaced at intervals around the turret, said turret being movable to bring each coil form to a winding station and thence to an unloading station, said placing means being located adjacent said unloading station, a flyer for winding the wire on the coil form at the winding station, each coil form having steps for winding coils of different sizes thereon, said flyer being shiftable for winding coils on different steps of the coil form at the winding station, means for shifting the flyer for winding on different steps of the coil form at the winding station, said flyer being mounted on a rotary and axially shiftable shaft, and said means for shifting the flyer comprising a movable shift member, a connection between the shift member and the shaft, a plurality of spaced stops each movable between a stop position for engagement by the shift member and a retracted position clear of the shift member, means for biasing the shift member toward the stops, and means for individually moving each stop between its stop position and its retracted position.

2. Apparatus as set forth in claim 1 wherein the connection between the shift member and the shaft comprises a level wind member movably mounted on the shift member, and wherein means is provided for traversing the level wind member relative to the shift member.

3. Apparatus for providing a winding for a stator of the type having a bore and slots extending outward from the bore comprising means for winding a wire into a plurality of groups of coils of different sizes for placement in the slots of the stator leaving the wire intact between successive coils of each group and between successive groups for integral interconnection of the coils in each group and for integral interconnection of the successive groups, said winding means comprising an indexing turret having a plurality of coil forms spaced at intervals therearound, said turret being movable to bring each coil form to a winding station and thence to an unloading station, a flyer for winding the wire on the coil form at the winding station, and means mounted adjacent the unloading station for receiving each group of interconnected coils unloaded from the coil form at the unloading station without severance of the wire between that group and a succeeding group wound on the next coil form and for placing the plurality of unloaded groups in the slots of a stator, whereby said plurality of groups of coils may be placed in the slots of a stator without severance of the wire between the groups and whereby a group may be wound at the winding station while said plurality of groups of coils is being placed in the slots of a stator by said placing means, said turret being a rotary indexing turret rotatable in steps to bring each coil form to the winding station and thence to the unloading station, the turret being rotatable after the unloading of a group of coils from the coil form at the unloading station and the winding of the wire on the coil form at the winding station to bring an unloaded coil form to the winding station for proceeding with winding of the wire thereon without severing the wire, each coil form having steps for winding coils of different sizes thereon, and wherein there is provided a rotary and axially shiftable shaft in line with the coil form at the winding station, the flyer being mounted on the shaft and rotary and shiftable with the shaft for winding the wire into coils on different steps of the coil form, and wherein means is provided for shifting the shaft and the flyer for winding the wire on different steps of the coil form comprising a movable shift member, a connection between the shift member and the shaft, a plurality of spaced stops each movable between a stop position for engagement by the shift member and a retracted position clear of the shift member, means for biasing the shift member toward the stops, and means for individually moving each stop between its stop position and its retracted position, the connection between the shift member and the shaft comprising a level wind member movably mounted on the shift member, and wherein means is provided for traversing the level wind member relative to the shift member, said shift member comprising a pivoted shift lever and each stop comprising a pin axially slidable between a stop position in the path of the shift lever and a retracted position clear of said path.

4. Apparatus as set forth in claim 3 wherein said shift lever is swingable away from a first position engaging a first pin to successive positions engaging successive pins, and said biasing means comprises an air cylinder connected to said lever and operable for biasing said lever against successive pins and for retracting the lever to its said first position on completion of winding on different steps of the coil form.

5. Apparatus as set forth in claim 3 wherein the connection between the shift lever and the shaft comprises a level wind lever pivoted on the shift lever, and means is provided for oscillating the level wind lever about its pivot on the shift lever.

References Cited

UNITED STATES PATENTS

| | | | |
|---|---|---|---|
| 2,011,114 | 8/1935 | Papin. | |
| 2,445,109 | 7/1948 | Ferguson | 242—9 X |
| 2,861,601 | 11/1958 | Marzolf | 242—9 X |
| 3,036,603 | 5/1962 | Moore. | |
| 3,137,931 | 6/1964 | Moore | 29—205 |
| 3,324,536 | 6/1967 | Hill | 29—205 |
| 3,331,403 | 7/1967 | DeYoung | 140—92 X |

JOHN F. CAMPBELL, Primary Examiner

C. E. HALL, Assistant Examiner

U.S. Cl. X.R.

29—596, 605; 57—99; 140—92.1; 242—9